Figure 1:
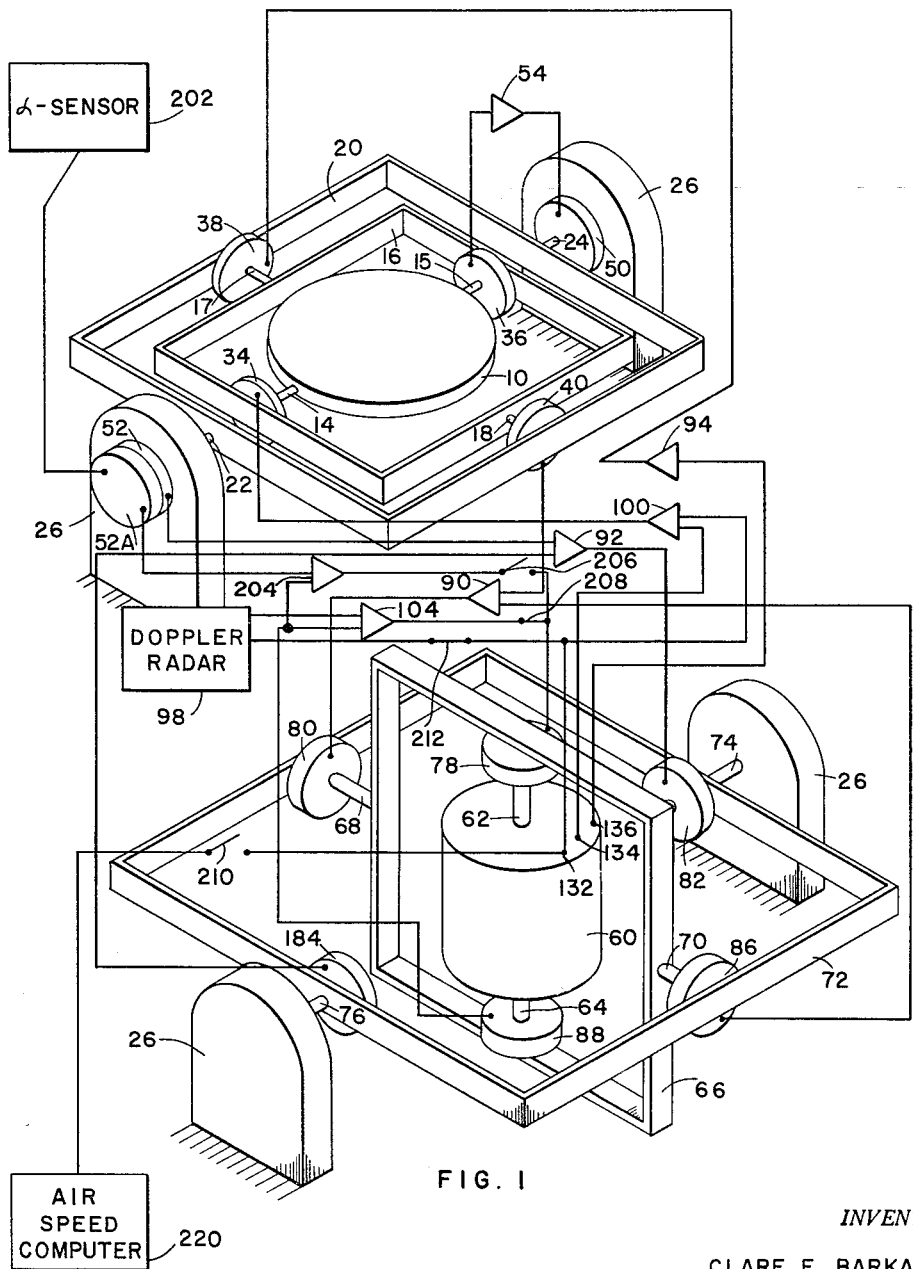

INVENTOR.
CLARE E. BARKALOW
HENRY C. DAUBERT JR.
BY

ATTORNEY

Jan. 26, 1965 C. E. BARKALOW ETAL 3,167,763
VERTICAL SENSOR
Filed May 5, 1960 3 Sheets-Sheet 2

INVENTOR.
CLARE E. BARKALOW
BY HENRY C. DAUBERT JR.

ATTORNEY

*INVENTOR.*
BY CLARE E. BARKALOW
HENRY C. DAUBERT JR.

ATTORNEY though the device of this invention is described
United States Patent Office 3,167,763
Patented Jan. 26, 1965

3,167,763
VERTICAL SENSOR
Clare E. Barkalow, Comstock Park, and Henry C.
Daubert, Jr., Grand Rapids, Mich., assignors, by mesne
assignments, to Lear Siegler, Inc., Santa Monica, Calif.,
a corporation of Delaware
Filed May 5, 1960, Ser. No. 26,997
18 Claims. (Cl. 343—9)

This invention pertains to means, supported by a moving vehicle, for determining the direction of the local vertical. More particularly, the vertical sensor of this invention is adapted to be supported by an aircraft, or the like.

The usual means for maintaining a vertical reference on an aircraft is to utilize a vertical gyroscope which is erected in response to the relative angle between the spin axis of the vertical gyroscope and a pendulum.

Unfortunately, the position of the pendulum usually does not represent the direction of the true vertical because the pendulum is influenced by acceleration and turning of the supporting vehicle. The error in the position of the pendulum, which is caused by acceleration and turning of the supporting vehicle is herein called acceleration error. To utilize a pendulum (which is subject to acceleration error) it is usually necessary to disconnect the pendulum from the erecting mechanism when acceleration error exists.

During the period of acceleration and turning of the supporting vehicle, the inertia of the gyroscope wheel maintains the spin axis of the gyroscope in a substantially constant direction relative to inertial space. With the increased speed of the modern vehicle a significant arc is traversed over the surface of the earth during the period when the pendulum is disconnected from the gyroscope erecting mechanism, to cause the gyroscope to become misaligned relative to the local vertical. Earth rotation during the period when the pendulum is disconnected from the erecting mechanism also causes the spin axis of the gyroscope to become misaligned relative to the local vertical. Further, imbalance of the gyroscope, friction of the bearings and dirt cause the gyroscope to drift.

Although the device of this invention is described herein in terms of its air-support value, it is to be stressed that the device conveniently may be utilized wherever the acceleration error problem occurs such as—for example—in a submarine. Acceleration error between an erecting pendulum and a vertical gyroscope doubtless will become more acute in the submarine guidance art as the speed of maneuvering of submarines increases.

It is also within the scope of this invention that the supporting vehicle need not be necessarily an aircraft or a submarine.

A significant improvement in the accuracy of the position of the spin axis of the vertical gyroscope is achieved by correcting for acceleration error of the pendulum and by allowing the pendulum to continue to control the erecting mechanism of the vertical gyroscope during acceleration and turning maneuvers of the supporting vehicle.

One of the means heretofore proposed to correct for acceleration errors of the pendulum is to mount a variable speed gyroscope with a horizontal spin axis upon a two degrees of freedom, untorqued gimbal system relative to the vertical gyroscope. In the heretofore proposed means, the horizontal spin axis of the variable speed gyroscope is positioned normal to the heading of the supporting vehicle. The rotor of the variable speed gyroscope is electrically driven with a pendulum attached to the stator winding. The rotor of the variable speed gyroscope is angularly accelerated relative to its pendulum supporting stator to cause the rotor angular velocity to be continuously proportional to the air speed of the supporting vehicle. During longitudinal acceleration of the supporting vehicle the inertially produced torque applied by the pendulum to the stator just balances the electrically produced torque applied between the rotor and stator. During turns of the supporting vehicle, gyroscopic action of the variable speed gyroscope prevents average pendulum displacement, thus causing the average direction of the pendulum to be in the direction of the local vertical.

It is one of the improvements of this invention to modify the device of the prior art to cause the variable speed gyroscope to have an angular velocity which is proportional to the horizontal component of the air speed of the supporting vehicle. In an aircraft, air data devices which utilize pitot tubes, and the like, generate a signal which is a measure of the air speed of the aircraft. The air speed of the aircraft is resolved into its horizontal component by resolvers which are connected to the supporting structure of the vertical gyroscope.

If the supporting vehicle were a ship or submarine, marine logging devices could be utilized to produce a measure of the speed of the supporting vehicle. The electrical output of a speed sensing device could then be utilized, through suitable amplifiers and resolvers to servo the angular velocity of the rotor of the variable speed gyroscope to be proportional to the horizontal component of the measured speed.

One embodiment of the device described in this invention utilizes a variable speed gyroscope, mounted on the case of the vertical gyroscope. When the variable speed gyroscope, together with its untorqued gimbals, are mounted on the case of the vertical gyroscope, errors due to mass shift are significantly high, the package configuration is inefficient, and the device is bulky.

With the horizontal spin axis of the variable speed gyroscope normal to the heading of the supporting vehicle, when the vehicle rolls errors are introduced. When an aircraft rolls it does not roll about its roll axis. In this sense the "roll" axis is a misnomer. Rather the roll axis describes a conical surface whose axis is in the direction of the instantaneous air referenced velocity of the aircraft and whose apex angle is equal to twice the angle of attack of the aircraft.

To maintain the accuracy of correction for the acceleration error, the spin of the variable speed gyroscope should be oriented normal to the horizontal component of the air referenced velocity vector. To increase the accuracy, this invention contemplates supporting the untorqued gimbals and variable speed gyroscope in a torqued gimbal which is rotated in azimuth, relative to the roll axis of the supporting vehicle, through an angle whose sine is equal to the sine of the angle of attack multiplied by the sine of the roll angle of the supporting vehicle.

If the angular velocity of the variable speed gyroscope is proportional to the amplitude of the true air speed and if the angular momentum of the variable speed gyroscope wheel is normal to the horizontal component of the air referenced velocity vector, the acceleration error of the pendulum is completely compensated only if the wind velocity is constant.

If the wind velocity is not constant, complete compensation for acceleration error is achieved [in accordance with this invention] by causing the angular velocity of the variable speed gyroscope wheel to be proportional to the amplitude of the ground track velocity and by causing the angular momentum vector of the variable speed gyroscope wheel to be normal to the ground track velocity. To cause the angular momentum vector of the variable speed gyroscope to be normal to the ground track velocity, the untorqued gimbal system, which supports the variable speed gyroscope, is rotated in azimuth relative to the heading of the supporting vehicle. To determine the angle through which the untorqued gimbal system must be turned relative to the heading of the supporting vehicle a sensing device such as—for example—a doppler radar must be utilized to detect the drift angle of the supporting vehicle. The doppler radar also senses the ground track velocity of the supporting vehicle, which velocity signal is used to control the angular velocity of the variable speed gyroscope wheel. Descriptions of typical doppler radars which generate a signal proportional to the ground track velocity and a signal proportional to the drift angle of the supporting vehicle are shown and described in Aviation Age Magazine, September, 1957, pages 109, et seq.

It is therefore an object of this invention to provide means for reducing the acceleration error of a gimbaled pendulum in a supporting vehicle.

It is yet another object of this invention to provide means for reducing the acceleration error of a gimbaled pendulum which is utilized to control the erecting mechanism of a vertical gyroscope.

It is still another object of this invention to provide means for reducing the effect of acceleration and turns of a supporting vehicle upon a supported pendulum in said vehicle.

It is also an object of this invention to compensate for acceleration error of a gimbaled pendulum which is utilized to control the erecting mechanism of a vertical gyroscope during acceleration, turns and rolls of the supporting vehicle.

It is still another object of this invention to provide means for reducing the acceleration error of a gimbaled pendulum which is used to control the erecting mechanism of a vertical gyroscope under changing conditions of velocity of surrounding fluid medium.

It is another object of this invention to provide a device as recited in the next preceding object in which said fluid medium is air.

It is another object of this invention to provide a device as recited in the second next preceding object in which said fluid medium is fresh or salt water.

Figure 2:
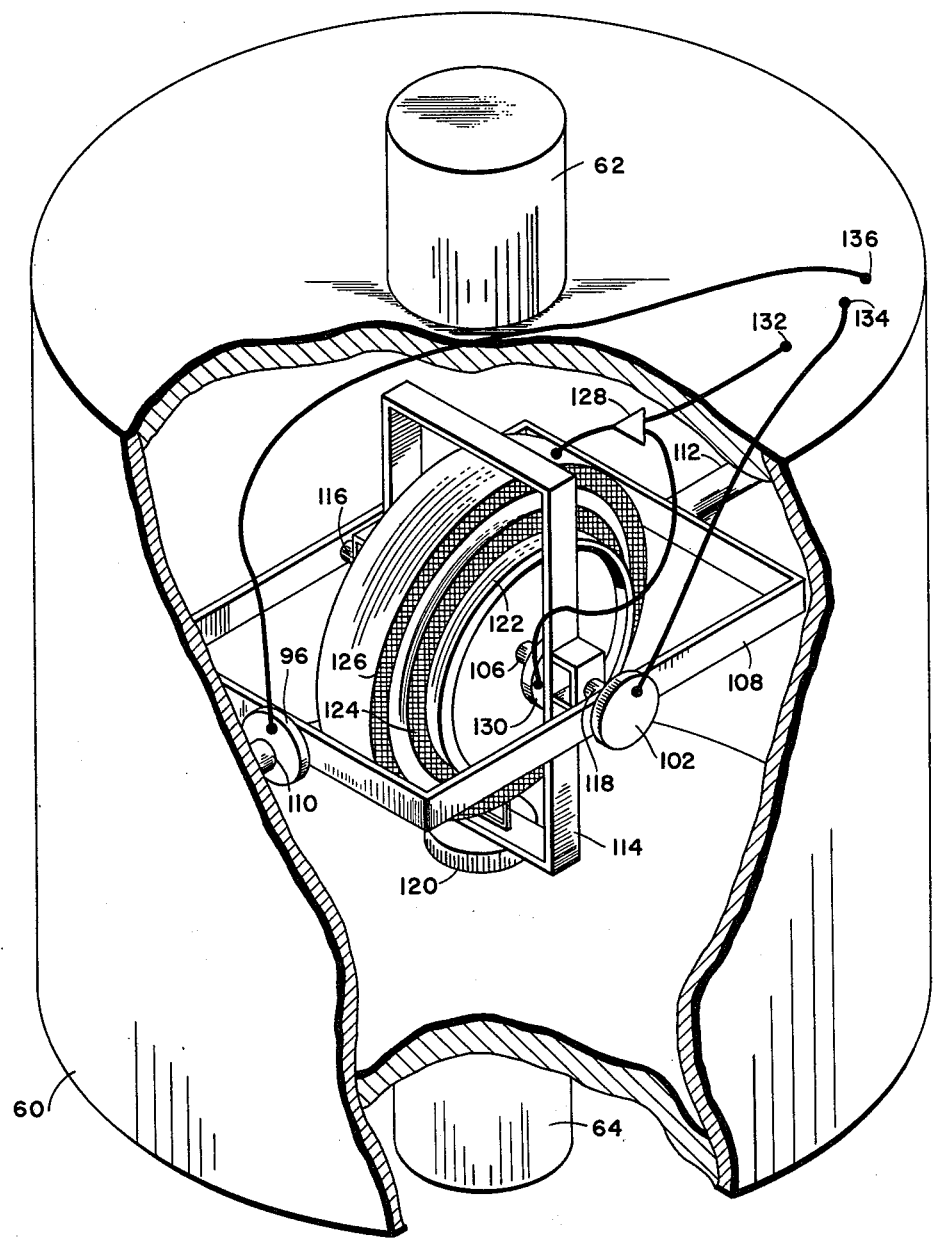
Figure 3:
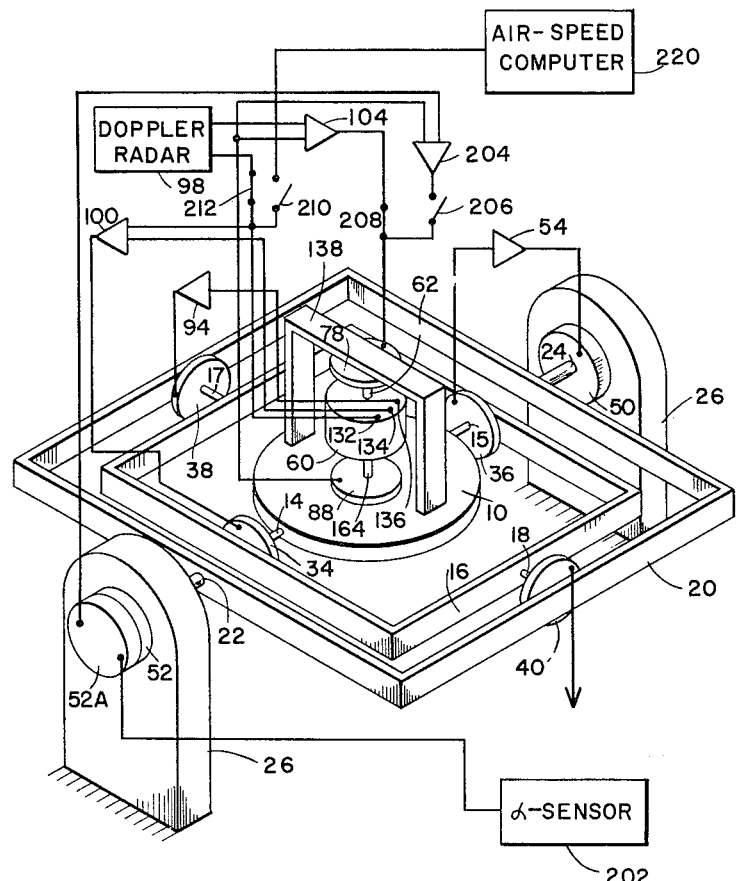

Other objects will become apparent from the following description when taken in connection with the accompanying figures in which:

FIGURE 1 is a schematic diagram of a vertical gyroscope, a device of this invention supported on a gimbal system whose position is slave $d$ to the vertical gyroscope, and means connected to the output of this invention for supplying erecting torques to the vertical gyroscope;

FIGURE 2 is a view, partially in section and partially in profile, of a variable speed gyroscope of this invention, supported upon a two-axis untorqued gimbal system; and FIGURE 3 is a schematic diagram of a vertical gyroscope, a device of this invention supported on the vertical gyroscope, and means connected to the output of this invention for supplying erecting torques to the vertical gyroscope.

In FIGURE 1, vertical gyroscope 10 is gimbal-mounted relative to a supporting vehicle, such as an aircraft 26. Gimbal 20 is mounted for controlled rotation relative to supporting vehicle 26 upon a pair of coaxial shafts 22 and 24. Gimbal 16 is mounted for controlled rotation relative to gimbal 20 about an axis normal to the axis of shafts 22 and 24 upon shafts 17 and 18. Vertical gyroscope 10 is mounted relative to gimbal 16 upon a pair of coaxial shafts 14 and 15 whose axis is normal to the axis of shafts 17 and 18. Gimbal 20 is servoed to follow a signal from angular pickoff 36 through a closed servo loop which utilizes summing amplifier 54 to control torquer 50 in response to signals from angular pickoff 36. Pitch erecting torques are applied to shaft 41 by torquer 34. Roll erecting torques are applied to vertical gyroscope 10 by torquer 38.

Gimbal 72 is slaved to the position of gimbal 20 by means of pickoff 52, amplifier 92, torquer 82, and a feedback servo loop from angular pickoff 184 to the input of amplifier 92. Gimbal 66 is slaved to a position normal to the plane of gimbal 16 by means of angular pickoff 40, amplifier 90, torquer 80, and a closed servo loop from angular pickoff 86 to the input of amplifier 90.

In one mode of operation of the device of this invention, it is desirable to utilize doppler radar 98. When doppler radar 98 is utilized, switches 208 and 212 are closed. When switches 208 and 212 are closed, switches 206 and 210 are open. Switches 206, 208, 210 and 212 are shown as single throw switches for convenience, but in actual practice would be double throw switches or some other means for preventing the simultaneous closing of switches 210 and 212. In FIGURES 1 and 3, switches 208 and 212 are shown closed while switches 206 and 210 are shown open.

Doppler radar 98 generates a first electrical signal which is proportional to the drift angle of the supporting vehicle. The drift angle signal from the doppler radar 98 is connected through amplifier 104 and switch 208 to torquing means 78 to turn gimbal 60 through a predetermined angle relative to the heading of the supporting aircraft. A closed servo loop is supplied by angular pickoff 88 connected through amplifier 104 precisely to position gimbal 60.

Alternatively, angle of attack sensor 202 is connected through resolver 52A, amplifier 204, switch 206, to torquing means 78 to orient gimbal 60 through a predetermined angle relative to the heading of the supporting aircraft.

In one alternative embodiment of this invention, gimbal 60 is rigidly fixed to gimbal 66 to cause the spin axis of the variable speed gyroscope of this invention to be positioned normal to the heading of the supporting vehicle. However, in one preferred embodiment of this invention, the spin axis of the variable speed gyroscope is maintained normal to the horizontal component of the true velocity of the supporting vehicle.

Referring now to FIGURE 2, gimbal 60 is positioned (in one embodiment of this invention) with the spin axis of shaft 106 normal to the true air speed vector of the supporting vehicle. In an alternative embodiment, the spin axis of shaft 106 and rotor 122 is rotated through an angle equal to the sine of the angle of attack multiplied by the sine of the roll angle of the supporting vehicle. In preferred embodiment of this invention, the spin axis of shaft 106 and rotor 122 is maintained normal to the horizontal component of true velocity of the supporting vehicle relative to the earth.

Rotor 122 and stator 126 are supported for two degrees of angular freedom upon untorqued gimbals 114 and 108. Gimbal 108 is supported relative to gimbal 60 upon coaxial shafts 110 and 112. Gimbal 114 is supported relative to gimbal 108 upon shafts 116 and 118. Rotor 122 is positioned relative to gimbal 114 to rotate about an axis which is usually coaxial (but only need be parallel) with the axis of shafts 116 and 118. An electric motor stator winding 126 and rotor winding 124 is shown as a preferred embodiment of a means for generating a torque between gimbals 114 and rotor 122. Pendulum 120 is attached to gimbal 114 to cause gimbal 114 to be sensitive to acceleration and turns of the supporting aircraft.

Doppler radar 98 has a second electrical output which is proportional to the amplitude of the velocity of the supporting vehicle over the surface of the earth. The second electrical output of the doppler radar 98 is connected through switch 212 to stator 126 to drive rotor 122 at an angular velocity which is proportional to the horizontal component of ground velocity. Angular pickoff 130 forms a closed servo loop through amplifier 128 to servo the angular velocity of rotor 122 to the signal from the output of radar 98. The scale factor which relates the angular velocity of rotor 122 to the ground track velocity is determined so that angular accelerations of rotor 122 which are generated by a torque applied between stator winding 126 and rotor winding 124 are just exactly proper to compensate for acceleration error of pendulum 120 due to acceleration of the supporting vehicle. Angular pickoffs 102 and 96 are utilized to generate signals which are proportional to the position of pendulum 120 about each axis and which are connected to apply erecting torques to gyroscope 10.

Airspeed computer 220 may be, (for example) a conventional true air speed computer which is adapted to generate an electrical signal proportional to the speed of the aircraft relative to its surrounding air mass. The electrical output of air speed computer 220 is connected through switch 210 and terminal 132, and amplifier 128 to stator winding 126 to drive rotor 122 at an angular velocity which is linearly proportional to the voltage output of airspeed computer 220. The speed of rotor 122 is controlled by means of a signal generator 130 connected through amplifier 128 to create a closed servo loop.

Amplifier 94 is connected to angular pickoff 96 to generate a signal to drive torquer 38 to apply erecting torques to erect gyroscope 10 about the axis of shafts 14 and 15. Amplifier 100 is connected to mix signals from angular pickoff 102, and the velocity output of doppler radar 98 through switch 212 or air speed computer 220 through switch 210 to generate a signal to control the torque applied by torquer 34 to shaft 14 to erect gyroscope 10 about the axis of shafts 17 and 18. The velocity output of doppler radar 98 or air speed computer 220 is connected to the input of amplifier 100 to correct for profile errors due to the motion of the supporting vehicle over the curved surface of the earth.

In FIGURE 3, vertical gyroscope 10 is supported for controlled angular freedom by gimbals 16 and 20 relative to supporting vehicle 26. Gimbal 20 is supported relative to supporting vehicle 26 by a pair of shafts 22 and 24 whose axis is parallel to the roll axis of the supporting vehicle. Gimbal 16 is supported relative to gimbal 20 by a pair of coaxial shafts 17 and 18 whose axis is normal to the axis of shafts 22 and 24. Gyroscope 10 is supported relative to gimbal 16 upon a pair of coaxial shafts 14 and 15 whose axis is normal to the axis of shafts 17 and 18. Torques are applied between supporting vehicle 26 and gimbal 20 by means of torquer 50 connected to be controlled in response to signals from pickoff 36 through amplifier 54. Angular pickoff 40 is connected to generate a signal proportional to the elevation angle of vehicle 26.

Gimbal 60 is positioned for angular rotation about an azimuth axis relative to gimbal 138 and vertical gyroscope 10 upon a pair of shafts 62 and 164 which are coaxial with the azimuth axis. The placing of a structure as shown on the vertical gyroscope 10 would necessitate balancing counter-weights which are not shown.

Doppler radar 98 is connected by its drift angle signal through amplifier 104 and switch 208 to torquer 78 to position gimbal 60 in a predetermined position, as described above in connection with the description FIGURE 1. The position of gimbal 60 is sensed through a closed servo loop from angular detector 88 which is connected to the input of amplifier 104 in the usual manner. Alternatively, angle of attack sensor 202 generates electrical signal proportional to the sine of the angle of attack. The signal from angle of attack sensor 202 is connected through resolver 52A which generates a signal proportional to the sine of the roll angle of the supporting vehicle. The electrical output of resolver 52A is proportional to the sine of the angle of attack multiplied by the sine of the roll angle. The electrical output of resolver 52A is connected through amplifier 204 and switch 206 to torquer 78 which is adapted to position gimbal 60 through an angle proportional to the sine of the angle of attack multiplied by the sine of the roll angle relative to the direction of the axes of shafts 14 and 15. Angular pickoff 88 is connected to the input of amplifier 204 in the usual manner to provide a closed servo loop.

The interior of gimbal 60 is identical with that shown and described above in connection with FIGURE 2.

Amplifier 94 is connected to angular detecting device 96, to generate a voltage of the appropriate magnitude to cause torquer 38 to generate a torque about the axis of shaft 17 to erect gyroscope 10 about the axis of shafts 14 and 15. Amplifier 100 is connected to mix signals from the velocity output of doppler radar 98 through switch 212 or of air speed computer 220 through switch 210, and angular pickoff 102.

In both FIGURES 1 and 3, amplifier 100 utilizes the velocity output of doppler radar 98 or of air speed computer 220 to generate a signal which represents a correction due to the curvature of the earth over which the supporting vehicle is moving.

In operation, gyroscope 10 is initially erected by external means (not shown). Pitch of the supporting vehicle is detected by detecting means 40. Roll of the supporting vehicle is detected by detecting means 36 which causes torquer 50 to unwind gimbal 20 to thereby prevent gimbal lock. The signal output of angular pickoff 52 represents a signal which is proportional to the roll angle between gimbal 20 and the supporting vehicle.

In the device of FIGURE 1, gimbal 72 is servoed to the position of gimbal 20 by means of amplifier 92 and a closed servo loop through pickoff 184 in response to signals from angular pickoff 52. Gimbal 66 is servoed to a plane normal to the plane of gimbal 16 through a closed servo loop and amplifier 90 which controls torquer 80 in response to an error signal between a control signal from angular pickoff 40 and a closed servo loop position signal from angular pickoff 86.

While in one embodiment of this invention gimbal 60 is rigidly attached to gimbal 66, in one preferred embodiment of this invention gimbal 60 is servoed about the azimuth axis by means of a closed loop servo from a control signal generated by doppler radar 98 or angle of attack sensor 202 and resolver 52A to cause torquer 78 to position gimbal 60 so that the spin axis of shaft 106 and rotor 122 (see FIGURE 2) is normal to the ground track velocity or to the air velocity vector.

Referring to FIGURE 2, rotor 122 is servoed to a predetermined speed through a closed loop servo from angular pickoff 130 and through amplifier 128 in response to control signals from the velocity output of doppler radar 98 or air speed computer 220.

When the horizontal component of air referenced velocity of the supporting vehicle is detected by airspeed computer 220, torque is applied between stator winding 126 and rotor winding 124 just to counteract acceleration errors which are sensed by pendulum 120. Pendulum 120 tends to cause gimbal 114 to swing but the torque between stator 126 and rotor 122 is equal and opposite to the torque caused by acceleration forces so that pendulum 120 and gimbal 114 do not move in response to acceleration of supporting vehicle.

When the horizontal component of acceleration of the supporting vehicle in the direction of the ground track velocity is detected by doppler radar 98, torque is applied between stator winding 126 and rotor winding 124. Horizontal acceleration is also detected by pendulum 120. Pendulum 120 tends to cause gimbal 114 to swing but the torque between stator 126 and rotor 122 is equal and opposite to the torque caused by acceleration forces applied to pendulum 120 so that pendulum 120 and gimbal 114 do not move in response to acceleration of the supporting vehicle.

When the supporting vehicle turns, pendulum 120 tends to swing to cause gimbal 108 to rotate about shafts 110 and 112. The turning of the supporting vehicle, however, causes rotor 122 to generate gyroscopic torques which are just equal in magnitude and opposite in sense to the torque applied by pendulum 120.

The conditions for obtaining high accuracy on the device of this invention are that the angular momentum of gyroscope rotor 122 should be equal to the pendulosity of pendulum 120 multiplied by the sensed velocity (either ground track or true air velocity). The pendulosity of pendulum 120 is equal to the product of the supported mass by the distance from the axis of shafts 116 and 118 to the center of mass of gimbal 114, stator 126 and pendulum 120. The angular momentum vector of gyroscope rotor 122 is maintained not only perpendicular to the sensed velocity but is also directed to the left of the path. The direction of the angular momentum vector is defined in accordance with a right-handed system of vector nomenclature.

Amplifier 94 amplifies a signal from angular pickoff 96 to generate a voltage which is applied to torquer 38 to erect gyroscope 10 about the axis of shafts 14 and 15. Amplifier 100 mixes signals from angular pickoff 102 and either doppler radar 98 through switch 212 or air speed computer 220 through switch 210 in a predetermined proportion to apply an erecting torque to torquer 34 to erect gyroscope 10 about the axis of shafts 17 and 18.

Thus, the combination of the vertical gyroscope plus the variable angular speed gyroscope compensating a pendulum in accordance with this invention is a very precise vertical sensor which reduces pendulum displacement in a more precise fashion than devices heretofore known.

Although the invention has been described in particularity above, it is not intended that the invention should be limited in accordance with the above description, but only in accordance with the scope and spirit of the following claims.

We claim:
1. In combination: a supporting vehicle; a first gimbal having freedom of rotation about a first axis parallel to the horizontal component of velocity of said vehicle relative to its adjacent air mass; a second gimbal positioned interior to said first gimbal and having freedom of rotation relative to said first gimbal about a second horizontal axis normal to said first axis; a pendulum connected to said second gimbal; a rotor rotatably mounted to spin relative to said second gimbal with its axis of rotation parallel with said second horizontal axis; detecting means for detecting the horizontal velocity of said aircraft relative to its adjacent air mass; motor means connected to drive said rotor; and means connected between said detecting means and said motor means to generate angular acceleration of said rotor thereby to generate a counter force which centers said pendulum into a vertical position.

2. In combination: a supporting aircraft; a first gimbal having freedom of rotation about a first axis parallel to the horizontal component of velocity of said vehicle relative to its adjacent air mass; a second gimbal positioned interior to said first gimbal and having freedom of rotation relative to said first gimbal about a second horizontal axis normal to said first axis; means for detecting the direction of true air velocity of said aircraft, drive means connected to said gimbals and to said direction sensing means to cause said second horizontal axis to be oriented in azimuth normal to the direction of motion of said vehicle relative to its adjacent air mass; a pendulum connected to said second gimbal; a rotor rotatably mounted to spin relative to said second gimbal with its axis of rotation parallel with said second horizontal axis; detecting means for detecting velocity of said aircraft relative to its adjacent air mass; motor means, connected to drive said rotor; and means connected between said detecting means and said motor means to generate angular acceleration of said rotor thereby to generate a counter force which centers said pendulum into a vertical position.

3. A device as recited in claim 2 and further comprising: a vertical gyroscope gimbaled about axes normally parallel to the pitch and roll axes of said aircraft positioned between said first gimbal and said aircraft; means for torquing said vertical gyroscope about the gimbal axis normally parallel to said aircraft roll axis; detecting means for detecting the angle about the gimbal axis normally parallel to said aircraft pitch axis and between the spin axis of said vertical gyroscope and the position of said pendulum; and means connected between said last named detecting means and said torquing means to erect said vertical gyroscope about the gimbal axis normally parallel to said aircraft pitch axis to the position of said pendulum.

4. A device as recited in claim 3 and further comprising: means for torquing said vertical gyroscope about the gimbal axis normally parallel to said aircraft pitch axis; detecting means for detecting the angle about the gimbal axis normally parallel to said aircraft roll axis between the spin axis of said vertical gyroscope and the position of said pendulum; and means connected between said last named detecting means and said last named torquing means to erect said vertical gyroscope about the gimbal axis normally parallel to said aircraft roll axis to the position of said pendulum.

5. A variable speed gyroscopic rotor, including a rotor shaft; a first gimbal having a pendulum attached thereto and positioned to support said rotor shaft; driving means connected between said first gimbal and said rotor to drive said rotor; a second gimbal, said first gimbal freely swinging therefrom about a horizontal axis parallel to the spin axis of said rotor; a supporting vehicle having at least a roll axis; support means for mounting said second gimbal for rotation about an axis parallel to said roll axis to maintain the axis of said rotor horizontal; means for sensing the direction and magnitude of a predetermined velocity; means for rotating said support means about an azimuth axis to cause the angular momentum vector of said rotor to be maintained horizontal and normal in direction and proportional to said velocity.

6. A device as in claim 5 and further comprising: means for detecting the angle of attack of said supporting vehicle and the angle of roll of said supporting vehicle; means for generating a signal proportional to the sine of the angle of attack multiplied by the sine of the angle of roll of said supporting vehicle, connected to rotate said support means about its azimuth axis through an angle which is proportional to the sine of the angle of attack multiplied by the sine of the angle of roll.

7. A device as recited in claim 6 in which said means for determining the angle of attack of said supporting vehicle is a vane.

8. In an aircraft, an airspeed computer adapted to generate a signal proportional to the amplitude of the velocity of said aircraft relative to its adjacent air mass; means for generating a signal proportional to the sine of the angle of attack of said aircraft; stabilizing means adapted to define an azimuth axis, a pitch axis and a roll axis of said aircraft; resolver means connected to said roll axis of said stabilizing means and to said angle of attack signal means to generate a signal proportional to the sine of the roll axis multiplied by the sine of the angle of attack of said aircraft; support means positioned upon said stabilizing means and connected to said resolver, rotated about said azimuth axis through an angle equal to the sine of the angle of attack multiplied by the sine of the roll angle of the supporting aircraft; a first gimbal positioned within said support means with freedom of rotation about a first axis parallel to the horizontal component of the air velocity vector of the supporting aircraft; second gimbal means including a pendulum means connected to said first gimbal means with freedom of rotation therebetween about a second horizontal axis normal to said first axis; angular detecting means connected between said gimbals to detect the position of said pendulum; rotor means adapted for rotation about a shaft, supported upon said second gimbal for rotation about said second horizontal axis; motor means connected between said second gimbal and said rotor means to drive said rotor means; means for sensing the magnitude of true air speed of said aircraft; and means connected between said true air speed means and said drive means to cause the torque applied to said second gimbal in a first sense due to acceleration of said rotor to be equal in magnitude but opposite in sense to the torque applied to said second gimbal by said pendulum.

9. In combination: a supporting vehicle; said supporting vehicle having a pitch axis, a roll axis and a yaw axis; a first gimbal having freedom of rotation about a first axis parallel to the horizontal component of velocity of said vehicle relative to the earth; a second gimbal positioned interior to said first gimbal and having freedom of rotation relative to said first gimbal about a second horizontal axis normal to said first axis; drive means connected to said gimbals to cause said horizontal axis to be oriented in azimuth normal to the direction of earth referenced velocity of said vehicle; a pendulum connected to said second gimbal; a rotor rotatably attached to said second gimbal with its axis coaxial with said second horizontal axis; detecting means for detecting motion of said pendulum; motor means connected to said rotor to drive said rotor; and means connected between said detecting means and said motor means to generate angular acceleration of said rotor to thereby generate a counter-force which centers said pendulum into a vertical position.

10. A variable speed gyroscopic rotor, including a rotor shaft; a first gimbal having a pendulum attached thereto; driving means connected between said first gimbal and said rotor to drive said rotor; a second gimbal, said first gimbal freely swinging therefrom about a horizontal axis; a supporting vehicle having at least a roll axis; means for mounting said second gimbal for rotation about an axis parallel to said roll axis to maintain the axis of said rotor horizontal; a support means; and means for detecting the drift angle of said supporting vehicle, connected to rotate said support means about its azimuth axis through an angle which is proportional to said drift angle.

11. A device as recited in claim 10 in which said means for determining the drift angle of said supporting vehicle is a doppler radar.

12. In an aircraft, a doppler radar adapted to generate a signal proportional to the drift angle of said aircraft and to the ground referenced velocity of said aircraft; stabilizing means adapted to define an azimuth axis; support means positioned upon said stabilizing means and connected to said doppler radar, adapted to be rotated about said azimuth axis through an angle proportional to said drift angle; a first gimbal positioned within said support means with freedom of rotation about an axis parallel to the ground referenced direction of motion of said aircraft; second gimbal means including a pendulum means connected to said first gimbal means with freedom of rotation therebetween about a horizontal axis; angular detecting means connected between said gimbal means to detect the angle between said pendulum and said stabilizing means; rotor means adapted for rotation about a shaft, supported upon said second gimbal means for rotation about said horizontal axis; motor means connected between said second gimbal means and said rotor means to drive said rotor means; and means connected between said doppler radar and said drive means to cause the torque applied to said second gimbal in a first sense due to acceleration of said rotor to be equal in magnitude to the torque applied to said second gimbal by said pendulum in a second sense.

13. In a supporting vehicle: a gimbaled rotor; means for maintaining the axis of said rotor horizontal and normal to the direction of motion of said supporting vehicle relative to the earth; pendulum means gimbaled in said vehicle with freedom of movement in the direction of motion of said vehicle; a doppler radar; and drive means controlled by said doppler radar, connected between said pendulum means and said rotor to apply opposition torques therebetween to thereby maintain said pendulum substantially vertical.

14. In a supporting vehicle: a gimbal positioned upon a horizontal axis normal to the direction of motion of said vehicle; means for maintaining said axis normal to said direction of motion; a pendulum connected to said gimbal; a rotor connected to said gimbal, having freedom of rotation about said axis, and motor means connected between said gimbal and said rotor to drive said rotor; means for detecting the direction of motion of said vehicle relative to the earth's surface; and means connected between said motor and said last named detecting means to drive said rotor in response to signals therefrom to maintain said pendulum in a substantially vertical position.

15. In combination: a vertical gyroscope, gimbaled relative to a supporting vehicle; means for detecting the horizontal component of velocity of the supporting vehicle; a two-gimbal system, mounted relative to said repeating means for freedom of rotation about an axis parallel to the heading of said supporting vehicle and about a horizontal axis normal thereto; a rotor mounted upon said two-gimbal system for freedom of rotation about said horizontal axis normal to the heading of said vehicle; a pendulum attached to said two-gimbal system for two degrees of freedom; means connected to said velocity detecting means for generating a torque between said rotor and said pendulum to compensate for changes in velocity due to accelerations of the supporting vehicle and due to turns of the supporting vehicle.

16. In combination: a vertical gyroscope, gimbal supported upon a supporting vehicle; a separate gimbaled means supported upon said vehicle; means mounted upon said supporting vehicle for detecting the magnitude and direction of the horizontal component of velocity of said supporting vehicle relative to the surface of the earth; a pendulum mounted for two degrees of freedom and one degree of controlled rotation relative to said separate gimbaled means, the controlled degree of rotation being about an azimuth axis, the first and second degrees of freedom being, respectively, free rotation about a pair of normal axes parallel and normal to the horizontal component of velocity and normal thereto; means connected to said velocity detecting means adapted and connected to align said last named gimbals about said azimuth axis; a rotor connected to said last named gimbals to spin about a horizontal axis normal to the horizontal component of velocity of said supporting vehicle; and means connected to said velocity measuring means adapted to apply a torque between said pendulum and said rotor proportional to the magnitude of acceleration of said vehicle in accordance with a predetermined ratio; angle detecting means connected to said pendulum and said vertical gyroscope to determine the angle between said pendulum and the spin axis of said vertical gyroscope; means connected between said angle detecting means and said vertical gyroscope to apply torques of appropriate magnitude and sense in response to signals from said detecting means to erect said vertical gyroscope to the position of said pendulum.

17. A gyroscopic instrument comprising in combination,
   (a) a gimbal having freedom of rotation about an axis,
   (b) a pendulous member connected to said gimbal, said pendulous member being subject to angular displacement,
   (c) a rotor, rotatably mounted to spin relative to said gimbal and having its axis of rotation parallel with said axis of said gimbal, (d) detecting means for detecting components of velocity of said instrument substantially normal to the axis of said gimbal,
(e) motor means to rotate said rotor, and
(f) control means connected between said detecting means and said motor means to control said motor means so as to provide a torque between said gimbal and said rotor and thereby oppose said angular displacement of said pendulous member.

18. A gyroscopic instrument comprising in combination,
(a') a first gimbal having freedom of rotation about a first axis
(a'') a second gimbal positioned interior to said first gimbal and having freedom of rotation relative to said first gimbal and about a second axis normal to said first axis,
(b') a pendulous member connected to said second gimbal, said pandulous member being subject to angular displacement during motion of said instrument,
(c') a rotor, rotatably mounted to spin relative to said second gimbal with its axis of rotation substantially parallel with said second axis,
(d) detecting means for detecting components of velocity of said instrument substantially normal to said second axis,
(e) motor means to rotate said rotor, and
(f) control means connected between said detecting means and said motor means to control said motor means so as to provide a torque between said second gimbal and said rotor and thereby oppose said angular displacement of said pendulous member during motion of said instrument.

References Cited in the file of this patent
UNITED STATES PATENTS
2,914,763 Greenwood Nov. 24, 1959